UNITED STATES PATENT OFFICE.

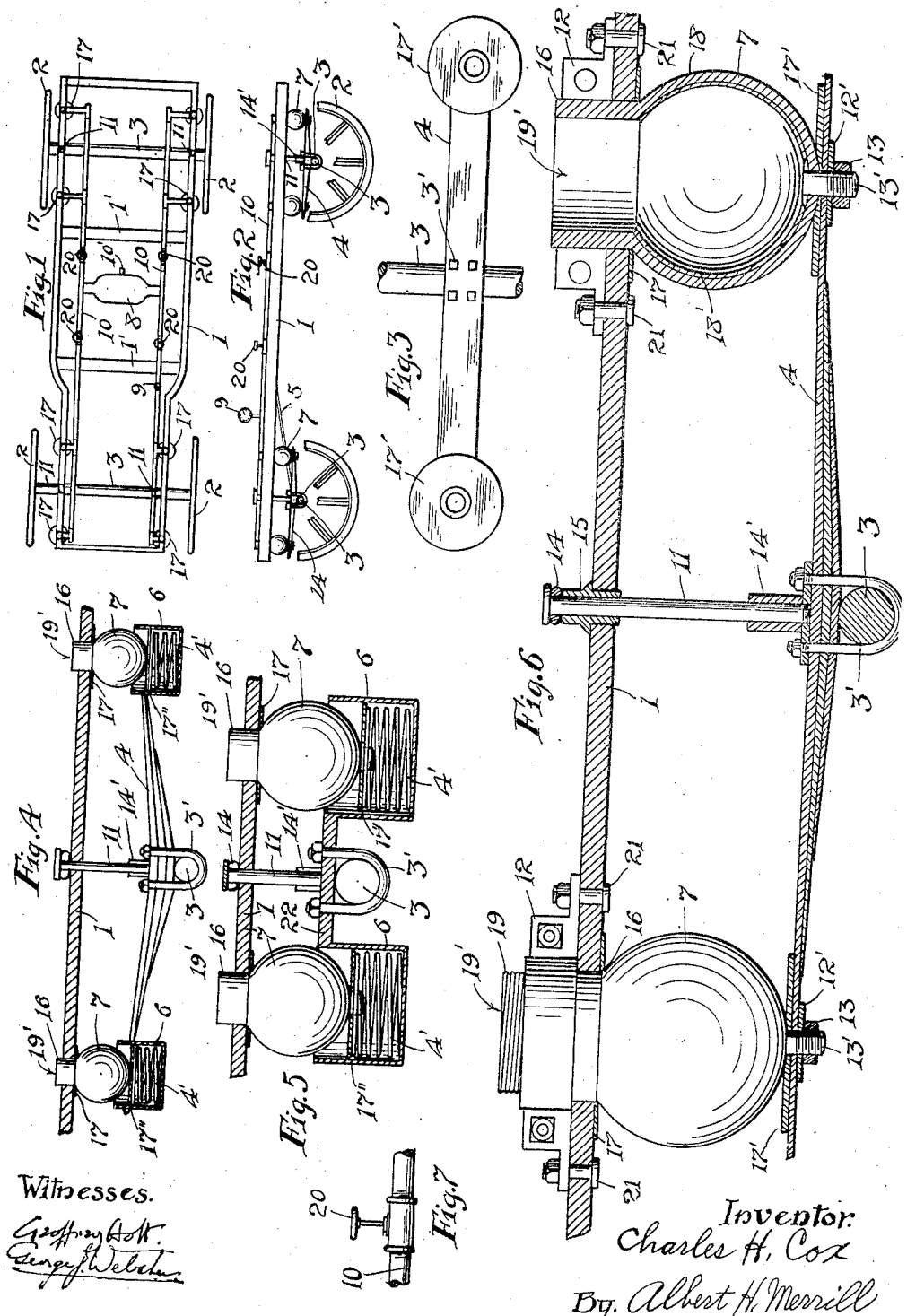

CHARLES H. COX, OF LOS ANGELES, CALIFORNIA.

SHOCK-ABSORBING APPARATUS FOR VEHICLES.

992,708.      Specification of Letters Patent.    Patented May 16, 1911.

Application filed January 27, 1908, Serial No. 412,942. Renewed November 30, 1910. Serial No. 594,996.

*To all whom it may concern:*

Be it known that I, CHARLES H. COX, a citizen of the United States, resident at Los Angeles, in the county of Los Angeles and State of California, have invented new and Improved Shock-Absorbing Apparatus for Vehicles, of which the following is a specification.

This invention is an improvement on the invention described in my application, Serial No. 392,561, filed September 12, 1907.

My invention relates to new and improved accessories for my pneumatic shock absorbers with auxiliary air tank attached thereto, which will facilitate the absorption of shocks and provide for the more extensive use of my pneumatic shock absorbers. Said accessories consist (in part) of new and improved spring seats with cups, coil springs and tables attached thereto. Also a rigid seat with cups, coil springs and tables attached thereto for my pneumatic shock absorbers to deform on; improved fastening means for the pneumatic shock absorbers, a plurality of king bolts, a plurality of air valves; also rubber bumpers in connection with the aforesaid king bolts, substantially as set forth in my drawings.

An object of this invention is to provide improved seats with tables attached thereto for my pneumatic shock absorbers to deform on; also new and improved spring seats with a cup attached to each end thereof, said cup containing a coil spring with a table attached to said coil spring for the pneumatic shock absorbers to deform on, said coil springs are used in connection with the spring seats for the purpose of producing a longer vibration than would be produced by using a short spring, thus enabling the pneumatic shock absorbers to more perfectly neutralize the recoil of said spring seats, where the general condition of the roadbed is such that long vibrations are produced by shocks encountered. A shorter spring may be used, or a spring seat without the coil spring device, as per Figure 6 where long vibrations caused by shocks are seldom encountered, for instance, on city streets. The same style of cups and coil springs are shown attached to a rigid seat, said design being better adapted for trucking, electric street cars, and the like. In each case a king bolt may be used (as per drawings) for the purpose of overcoming lateral displacement.

Another object is to use valves on the air line from the auxiliary air tank to the pneumatic shock absorbers, said valves being so arranged as to prevent the whole system from becoming disabled in the event of a leakage of air in said system.

A further object is the displacement of the present costly and comparatively easily punctured pneumatic tire by the less expensive and more durable hard rubber tire, which is made possible by the use of the hereinmentioned mechanism which provides said pneumatic shock absorbers with extra absorbing ability.

These and other objects may hereinafter appear.

I attain these objects by the use of the mechanism illustrated in the accompanying drawings, in which—

Fig. 1 is a view in plan, showing the body portion of an automobile frame, with auxiliary air tank, check valve, air pipes, air gage and king bolts attached thereto. Fig. 2 is a side elevation of a portion of an automobile frame, showing pneumatic shock absorbers on the spring seats. Fig. 3 is a view showing spring seats with tables for the pneumatic shock absorbers to deform on and section of axle attached thereto. Fig. 4 is a side elevation of a spring seat showing metallic cups attached thereto, said cups containing coil springs and tables attached to said coil springs for my pneumatic shock absorbers to deform on when necessary, said cups being attached to each end of the aforesaid spring seats; also showing a portion of an automobile frame with plates for the pneumatic shock absorbers to deform against. A king bolt is shown which is connected with the springs below and passes through an aperture in the automobile frame, said king bolt is provided for different purposes, to-wit: When the vehicle is in motion, or a shock is received while said vehicle is in action and subjected to shocks, it necessarily follows that the spring seat bends, both downward and upward, the pneumatic shock absorbers deforming correspondingly, thus bringing the body portion and the axle portion of the vehicle closer together than while in a normal or stationary condition. The king bolts, under such conditions, move upward and downward through the aperture provided in the body portion frame of the vehicle, thus allowing free deformation and reformation of both spring seat and pneumatic shock absorbers, said king bolt also furnishes an approximate rigidity between the axle portion and body frame portion of the vehicle, thus preventing lateral displacement when rounding a curve, or the like. Fig. 5 is the same as Fig. 4, excepting that it has a short rigid seat instead of a spring seat. Fig. 6 is a view, in elevation, showing my spring seat and portion of automobile frame with pneumatic shock absorbers attached thereto, together with my improved means of fastening said pneumatic shock absorbers to the spring seats and the automobile frame. My king bolt is also shown with king bolt bearing screwed through the body frame piece; rubber bumpers are shown (as per drawings) to protect the pneumatic shock absorbers from injury caused by collapsing in the event of a leakage of air, or extra strain caused by a very violent shock. Fig. 7 is an elevational detail of one of the valves.

The action and benefits derived from the use of the hereinmentioned pneumatic shock absorbers are, as follows: When a shock is encountered, caused, for example, by crossing a railroad track, or by a wheel dropping into a depression in the roadbed, the air in both the shock absorbers and the auxiliary air tank acts as one body, and, therefore, by reason of the large body of air against which the shock is directed, said shock is absorbed in an efficient manner. To further illustrate: When a shock is encountered the action thereof causes the spring to bend and deforms the pneumatic shock absorbers by displacing that portion of the compressed air in the pneumatic shock absorbers lying next the point of contact, said point of contact being that portion of the metallic seats mentioned as the tables for the pneumatic shock absorbers to deform on and situated at the ends of the spring, forming what is termed spring seats, said spring seats being attached at their centers to the axle of the vehicle, substantially as set forth in my drawings. The aforesaid spring seats with tables attached thereto are provided for the pneumatic shock absorbers to deform on, as, for instance, a pneumatic tire deforms on the roadbed when subjected to a load, or shock, and the purpose of the aforesaid spring is to retard the velocity of the shock, (the recoil of said spring caused by said shock, will be absorbed by the pneumatic shock absorbers, as the action of both the spring and the pneumatic shock absorbers is (when the shock is relieved) to reform, thereby neutralizing the recoil of said spring, thereby preventing the bad effects of the shock from reaching the body portion of the vehicle.) The shock, or load, added is manifested by a displacement of the air and deformation of the pneumatic shock absorbers next the point of contact, (said point of contact being the hereinbeforementioned spring seats.)

The deformation of said pneumatic shock absorbers affords greater contact surface, which enables the pneumatic shock absorbers to support the vehicle, or load, irrespective of the shocks encountered, there being no further perceptible compression of air in the pneumatic system owing to changing conditions caused by the aforesaid action. Therefore the recoil is efficiently deadened by the absorbing effect secured by reason of the relatively small amount of air displaced in comparison with the large volume of air into which it is merged. That is to say, there is, practically, no continuation of up and downward movements of the body of the vehicle such as otherwise cause an unfavorable action upon the occupants of the vehicle. The principles are the same as the pneumatic tire principles, excepting a difference, to-wit: The absorption of the springs' recoil to the extent above set forth by the pneumatic shock absorbers. The outlet for air from said pneumatic shock absorbers to the auxiliary air tank is equal to the displacement of air under all conditions.

Similar letters refer to similar parts throughout the several views.

With reference to Fig. one (1) No. 1 is the side piece and portion of an automobile frame and 1' are the cross-pieces of said frame. 2 are vehicle wheels. 3 are axles and 3' are clamp bolts used to fasten the spring seats to the axle. 4 are spring seats connected to axle by clamp bolts 3'. 4' are coil springs. Said coil springs 4' are peculiarly adapted to support the tables 17'' within the cups 6 for the reason that the springs fit within the cups and also extend around under the tables near the outer edges thereof thus giving an upward pressure upon the tables in an even manner. 5 are axle rods connecting the axle and body frame portion. 6 are cups for said coil springs 4' to deform in. 7 are the pneumatic shock absorbers. 8 is the auxiliary air tank. 9 is an air gage and 10 are air pipes. 11 are the king bolts. 12 are combination clamps used to fasten the pneumatic shock absorbers to the frame piece and also to fasten around the shanks of the pneumatic shock absorbers for the purpose of preventing the air from leaking between said pneumatic shock absorbers and the metallic pipe connection. 12' are washers. 13 are nuts. 13' are anchor bolts. 14 and 14' are rubber bumpers used to protect the pneumatic shock absorbers from sustaining any injury in the event of a leakage of air or the effects of a very hard shock. 15 is a metallic bearing for the king bolt to operate through according to the shocks received. 16 are pneumatic shock absorber shanks. 17 are plates for the pneumatic shock absorbers to deform against. 17' are the tables carried by the vehicle springs 4 shown in Figs. 3 and 6 for the pneumatic shock absorbers to deform on. 17″ are the tables for the pneumatic shock absorbers to deform on, said tables being attached to the aforesaid coil springs. 18 is fabric. 18′ is the inner bulb. 19 is a metallic pipe connection. 19′ are air passages. 20 are manually operated valves on the air pipes to prevent the entire system from becoming disabled in the event of a leakage of air. 21 are clamp bolts. 22 is the rigid seat. The shock absorbing bulbs 7 are held in place between the table 17′ and the body of the vehicle by means of bolts designated as 13′, in Fig. 6, and the shank 16 at the top of the shock absorbers. Said shank 16 consists of an open-ended upward extension of each bulb 7 and in combination with clamps 12 affords means for fastening each bulb to the frame in the secure manner necessary to withstand the lateral movements of the frame with respect to the axles of a vehicle. The conduits 10 communicate with the top of said shanks by means of the metallic pipe connection 19 so that a secure and air-tight connection is formed between the tank 8 and the shock absorbing bulbs 7.

The benefits derived from the hereinmentioned improvements result in perfecting the pneumatic shock absorber with auxiliary air tank attached thereto to a degree sufficient to warrant the granting of the following claims.

It will be seen that in both forms of the invention shown, a flat surface or table underlies the spherical shock absorbers 7, said table being of considerable area and so placed as to form a bearing surface underlying the entire extent of the flattened bottom portion of the shock absorbers when they deform under the impact caused by the wheels of the vehicle passing over obstacles. The lower surface of the shock absorbers is not, therefore, at any time brought into contact with any angular edge such as might cause them to be worn at points of contact with the supporting means. The openings through which the shock absorbers communicate with the air tank 8, are located in the axis desirably at the top of each absorber rather than at its sides so that when the bulbs 7 deform, the strain is borne equally by the imperforate equatorial portion of the bulbs, each bulb being regarded as having an upright axis. The manner in which the shock absorbers and supporting means therefor are arranged on opposite sides of each axle equalizes the strain by causing them to coöperate in sustaining the shocks. The king bolts 11 hold the body of the vehicle in proper longitudinal position and at the same time allow it to freely rise and fall.

It will be seen that in both forms of the invention resilient means are provided for supporting the bulbs. In Fig. 5 supporting means include resilient means, springs 4′, while in the form shown in Fig. 6 the supporting means include the resilient arms. Each bulb is provided with a top opening from which extends a conduit which leads to and communicates with a reservoir for supplying an additional volume of air to said bulb. Said conduit, at the place where it enters the top of said bulb, passes through the means for supporting the body of the vehicle. This construction overcomes the disadvantage which would result if an opening were made in the side of the bulb to place the same into communication with the air reservoir. Side openings cannot be employed to advantage in pneumatic bulbs subject to vertical compression because the deforming of the bulb when compressed would sooner or later cause rupture thereof around a side opening. By making the opening in the top of the bulb where there is no deformation when a shock is encountered, the sides of the bulb are left imperforate so as to produce an even resistance and the union of the bulb with its supply conduit is effected in a manner which effectually prevents leakage at that point. Moreover, the necessity of an undesirable flexible conduit between the bulb and reservoir is avoided by leading the conduit into the top of the bulb instead of at the side thereof where there would be a relative movement between the reservoir and the union of the conduit with the bulb. A flexible conduit would be inferior to a rigid one on account of being liable to be injured by the jar of the vehicle so as soon to leak air where united to the bulb.

The improved shock absorbing bulbs set forth are not limited to use between the springs and body of a vehicle, but may be used in other relations if the attaching shank be made fast to the body which carries the pneumatic reservoir.

Therefore I claim:—

1. The combination with a vehicle frame and an axle thereof, of resilient supporting means carried by said axle, tables supported by said means, pneumatic shock absorbers on said tables, a king bolt passing slidably through a bearing connected to the vehicle frame, rubber bumpers to protect the shock absorbers from injury, and fastening means to fasten said shock absorbers in place between said tables and the frame of the vehicle.

2. The combination, with the body and axle of a vehicle, of a cup carried by said axle, a coil spring in said cup, a table yieldingly supported by said spring, a pneumatic shock absorber on said table, and means for holding said shock absorber between said table and vehicle body.

3. The combination, with the axle and body of a vehicle, of a rigid seat carried by said axle, cups attached to said seat, coil springs in said cups, tables on said springs, and shock absorbers on said tables to absorb shocks between said axle and vehicle body.

4. In a shock absorbing apparatus, the combination with the axle and frame of a vehicle, of a pneumatic bulb, resilient means carried by said axle and underlying said bulb to support the same, an open-ended shank projecting from the top of said bulb, means carried by said frame to hold said shank in place, an air reservoir, and a conduit affording communication between said shank and said reservoir.

5. The combination, with the axle and frame of a vehicle of a rigid seat carried by said axle, cups attached to said seat on opposite sides of the axle, coil springs in said cups, tables on said springs, pneumatic bulbs on said tables, said bulbs having hollow shanks projecting upwardly through said frame, an auxiliary air reservoir, and conduits connected with said reservoir and communicating with said bulbs through said shanks.

In testimony whereof, I have hereunto signed my name in the presence of two (2) subscribing witnesses at Los Angeles, in the county of Los Angeles and State of California, this twenty-first (21st) day of January, A. D. one thousand nine hundred and eight (1908.)

CHARLES H. COX.

Witnesses:
F. J. SPRING,
FRANCIS P. HARRINGTON.